(12) United States Patent
Praud et al.

(10) Patent No.: US 12,291,101 B2
(45) Date of Patent: May 6, 2025

(54) MOTOR MOUNT

(71) Applicant: Vibracoustic SE, Darmstadt (DE)

(72) Inventors: Stefen Praud, Nantes (FR); Franck Trimoreau, Nantes (FR); Arnaud Gattepaille, Clisson (FR)

(73) Assignee: Vibracoustic SE, Darmstadt (DE)

(*) Notice: Subject to any disclaimer, the term of this patent is extended or adjusted under 35 U.S.C. 154(b) by 0 days.

(21) Appl. No.: 18/378,706

(22) Filed: Oct. 11, 2023

(65) Prior Publication Data

US 2024/0123812 A1 Apr. 18, 2024

(30) Foreign Application Priority Data

Oct. 12, 2022 (EP) .................................. 22201003

(51) Int. Cl.
| | | |
|---|---|---|
| *B60K 5/12* | (2006.01) | |
| *F16F 1/38* | (2006.01) | |
| *B62D 21/11* | (2006.01) | |
| *F16F 15/08* | (2006.01) | |

(52) U.S. Cl.
CPC ............ *B60K 5/1208* (2013.01); *B62D 21/11* (2013.01); *F16F 1/3849* (2013.01); *F16F 15/08* (2013.01); *F16F 2224/025* (2013.01)

(58) Field of Classification Search
CPC ........ B60K 5/1208; F16F 1/38; F16F 1/3849; F16F 1/373; F16F 1/42; F16F 15/08; B62D 21/11
See application file for complete search history.

(56) References Cited

U.S. PATENT DOCUMENTS

2015/0276010 A1* 10/2015 Nakamura .............. F16F 15/08
                                                           248/634
2019/0329640 A1   10/2019 Kadowaki

FOREIGN PATENT DOCUMENTS

| CN | 109073021 B | * | 10/2020 | ............ F16F 1/373 |
| JP | 2003074635 A | * | 3/2003 | |
| KR | 20130091257 A | * | 8/2013 | |
| WO | WO-2011125667 A1 | * | 10/2011 | ............ F16F 1/3849 |
| WO | WO-2018046813 A1 | * | 3/2018 | ............ F16F 1/3828 |

OTHER PUBLICATIONS

EESR dated Apr. 3, 2023, EP22201003.5.

* cited by examiner

*Primary Examiner* — Eret C McNichols
(74) *Attorney, Agent, or Firm* — Fishman Stewart PLLC

(57) ABSTRACT

A motor mount includes an attachment member that can be attached to a first element, a framework that can be attached to a second element, and an elastomer body attached to the attachment member and forming at least two elastomer legs, with each of the elastomer legs having at least one groove. The framework includes a recess into which the attachment member is inserted extending along a first orientation. The framework further includes a first tongue, a second tongue, at least a first surface, and at least a second surface. The elastomer legs may be retained in a form-fit and press-fit manner in the framework, which may be ensured by engaging of the tongues into the grooves and compressing of the elastomer legs between respectively the tongues and the surfaces. A motor mount assembly may include a first element and/or a second element.

16 Claims, 5 Drawing Sheets

MOTOR MOUNT

CROSS-REFERENCE TO RELATED APPLICATIONS

This application claims priority to European Patent Application No. EP22201003.5, filed Oct. 12, 2022, the contents of which is hereby incorporated by reference in its entirety.

TECHNICAL FIELD

The invention relates to motor mounts and motor mount assemblies.

BACKGROUND

Motor mounts serve to support an engine or a motor against the body of a vehicle. For this purpose, the motor mount comprises elastic elements that elastically absorb the vibrations of the motor and can thus isolate them.

Said motor mounts are often designed to absorb the forces of the motor in the direction of travel (for example X-direction or $2^{nd}$ orientation), such as the mass inertia forces during braking and acceleration, as well as the weight force of the motor in a direction perpendicular to the direction of travel (for example Z-direction or $3^{rd}$ orientation) through elastomer blocks or wedges set in a respective plane (for example X-Z-plane or $2^{nd}$-$3^{rd}$-orientation-plane).

Motor mounts are known from daily practice and include at least an attachment member to which said motor can be attached, a framework to which said vehicle body can be attached, and at least an elastomer body elastically connecting said attachment member and said framework.

Motor mounts are known in which the elastomer body forms two legs through which a tab or a pin reaches. Said tab or pin serves to fix the respective leg. However, this fixation by said tab or pin leads to very high stresses occurring in the leg of the elastomer body in the area of said tab or pin when the leg is deformed accordingly. These stresses, however, are detrimental to the performance of the motor mount and lead to damage to the elastomer body in the course of the motor mount's service life.

SUMMARY

The invention is therefore based on the task of creating a motor mount that overcomes the problems of the prior art. Main features and embodiments of the inventive concepts are disclosed herein.

According to the invention, a motor mount, comprises
an attachment member to which a first element can be attached,
a framework to which a second element can be attached,
an elastomer body attached to said attachment member,
said elastomer body forming at least two elastomer legs, wherein each of said elastomer legs having at least one groove,
said framework comprising a recess into which said attachment member is inserted extending along a first orientation or Y-axis,
said framework comprising at least a first tongue and at least a second tongue,
said framework comprising at least a first surface and at least a second surface,
wherein the retention of said elastomer legs in a form-fit and press-fit manner in the framework being ensured by engaging of said tongues into said grooves and compressing of said elastomer legs between respectively said tongues and said surfaces.

For ease of description, a three-dimensional, rectangular, Cartesian coordinate system may be used for orientation, wherein said first orientation may correspond to the Y-axis (or transverse axis), a second orientation may correspond to the X-axis (or longitudinal axis), and a third orientation may correspond to the Z-axis (or vertical axis). The respective terms of a pair of directions may be used interchangeably in the context of the present disclosure. This coordinate system may base on an installed motor mount in a vehicle, exemplified in FIG. 1.

The elastomer body supports the attachment member vibrationally on the framework and serves to isolate vibrations. According to the invention, therefore, a motor mount for a vehicle is proposed in which the elastomer legs and the framework are formed in order to prevent previously occurring stresses from occurring in the first place. Said retention may be ensured by engaging of said tongues into said legs in a direction transverse to said first orientation, in order to minimize stresses when deformed. In other words, said first elastomer leg is compressed between said first tongue and said first surface and said second elastomer leg is compressed between said second tongue and said second surface.

In particular, each of the tongues forms a tongue-and-groove connection with the corresponding groove in the elastomeric leg. As a result, the respective tongue, which is the element for fixing the leg, is not completely surrounded by the leg on the circumferential side, so that despite sufficient fixation, the leg is nevertheless deformable and does not experience great stresses. The tongue engages only laterally in the leg and does not penetrate it, as the already known tab or pin does. In other words, the legs can therefore be free of a hole, in particular a hole in which an element for fixing the leg engages in order to penetrate said leg. A hole is understood to be a circumferentially closed hole, in particular in contrast to a groove. It should also be mentioned that when the elastomer body is deformed, friction is created between a tongue and the respective groove, which also serves to fix the respective leg.

The tongues extend in the first orientation and project in the second orientation. The respective extension may therefore be greater than the projection. The framework may form the tongues, preferably integrally. The grooves extend in the first orientation and project in the second orientation. The respective extension may therefore be greater than the projection. The legs may form the grooves, preferably integrally.

It is also advantageous that each leg forms a window with one of the corresponding surfaces through which the leg can squeeze when deformed. This also creates friction when deformed, which serves to fix said leg. The first tongue may therefore be arranged opposite the first surface with respect to the first window. Similarly, the second tongue can be arranged with respect to the second window opposite the first surface.

It is also advantageous to use tongues instead of tabs or pins, as this allows the framework to be much simpler in terms of design and cheaper in terms of production. The interior of the framework, i.e. the recess, can therefore be free of free-standing fixing elements, like tabs or pins.

The elastomer body and the attachment member may be joined by vulcanization. This creates a permanent connection that can be manufactured separately before the motor mount is assembled. The elastomer body can be pressed into the framework in the first orientation in a simple manner.

The first surface and second surface may be part of the circumferential surface of the recess.

A further embodiment of the motor mount according to the invention relates to the aspect that the retention is designed free of a material-fit. A material-fit can be produced by means of vulcanization, for example. Due to the tongue-and-groove connection, such a constructively and energy-intensive connection is not necessary. Furthermore, said embodiment advantageously supports a partial sliding of the respective leg past the tongue.

A further embodiment of the motor mount according to the invention relates to the aspect that said tongues project facing a transverse plane of the motor mount. The transverse plane may be spanned by the first orientation and third orientation. The two tongues project towards each other. Since the tongues are arranged on the outside of the recess (with respect to the transverse plane), there is a great deal of design freedom. Therefore, a larger space can be formed for the elastomer of the leg, because the more elastomer volume there is, the lower the occurring tension. Especially with regard to a wiper-motion, in which the elastomer body is loaded and deformed in opposite directions in the second orientation, low stresses occur as a result.

A further embodiment of the motor mount according to the invention relates to the aspect that a central course of the respective tongue and a central course of the respective elastomer leg enclose with each other an angle in the range of 90° to 70°, preferably the respective tongues project towards said first and second surfaces. An angle of less than 90° is advantageous, as this prevents the respective leg from slipping past the respective tongue too easily and thus improves fixation. Said two tongues can thus engage in the legs like hooks. The angle can face away from the attachment member so that the corresponding design advantageously counteracts slipping of the leg.

A further embodiment of the motor mount according to the invention relates to the aspect that the circumferential surface of the recess in the region of each leg forms an S-shaped course, the corresponding tongue also forming said S-shaped course, preferably one half of the S-shaped course. The specific design of the S-shape can influence the friction with the elastomer body.

A further embodiment of the motor mount according to the invention relates to the aspect that between the tip of each of the tongues and the respective leg there is a contact angle in the range from 270° to 90°, preferably from 180° to 135°. The tip of the corresponding tongue may form one half of the S-shaped course. It has been found that friction with the leg also increases as the contact angle increases. Over the extension of the contact angle, the corresponding leg and said tongue are in contact with each other.

A further embodiment of the motor mount according to the invention relates to the aspect that each of said elastomer legs has an elastomer foot that engages under the respective tongue, preferably both of the feet having a thickened portion whose largest diameter is greater than the smallest distance between the corresponding tongue and the corresponding surface. Said smallest distance may be formed by said window. The fact that each of the tongues form an undercut in which the respective foot engages can also advantageously prevent the leg from slipping out. The thickened portion, which does not fit through the smallest distance or window, also prevents the leg from slipping out.

A further embodiment of the motor mount according to the invention relates to the aspect that the diameter of the thickened portions may be in the range of 1.1 to 1.5, preferably 1.3, times greater than the smallest distance between the corresponding tongue and the corresponding surface. Said configuration prevents the leg from slipping out.

A further embodiment of the motor mount according to the invention relates to the aspect that each of said tongues engages into the respective elastomer leg for a distance ranging from ⅓ of the leg width to ⅔ of the leg width. In principle, it can be said that a deep intervention of a tongue in the respective leg has a better holding effect than a merely minor intervention. However, an intervention too deep could result in a leg with a very thin section that runs the risk of being damaged or even torn off under heavy loads. The values mentioned are therefore an optimum between a sufficiently large fixation effect on the one hand and a sufficiently large fatigue strength on the other. The width of the corresponding leg can be related to its central course.

A further embodiment of the motor mount according to the invention relates to the aspect that each of the elastomer legs is without an form-fit and/or press-fit and/or material-fit in a second orientation over a length of ⅖ to ⅞ of the total length of the respective elastomer leg, preferably ⅝ of the total length of the respective elastomer leg. The second orientation may be oriented perpendicular to the first orientation. The legs are thus free over the mentioned sections and/or do not rest laterally in these sections. This allows them to swing freely, which leads to particularly good insulation. This applies in particular to a wiper-motion. The length of the corresponding leg can be related to its central course. Furthermore, a section free to swing in at least said second orientation may lead to a long service life.

A further embodiment of the motor mount according to the invention relates to the aspect that each of said tongues has a sliding surface along which the corresponding elastomer leg is able to slide when deformed in a second orientation and/or around said first orientation. Said configuration helps to dispatch occurring stresses on a larger area to avoid stress concentration that could be critical for the motor mount's durability.

A further embodiment of the motor mount according to the invention relates to the aspect that the elastomer body and/or the framework is/are designed in such a way that the elastomer body is in continuous contact with the sliding surface even during deformation. This can create friction even when the corresponding leg is actually pulled or rotated away from the sliding surface. This effect can also and/or additionally be achieved by pressing in the elastomer body into said framework to create a pre-load that prevents the contact on the sliding surface from loosening.

A further embodiment of the motor mount according to the invention relates to the aspect that each of the feet is in circumferentially continuous contact with the framework. This allows a preload to be applied to each part of the foot, which has an advantageous fixing effect.

A further embodiment of the motor mount according to the invention relates to the aspect the attachment member forms a support structure against which the two legs rest, wherein the central course of each of the legs meeting the support structure at an angle in the range of 90° to 70°, preferably at right angles. This provides particularly good support for the legs.

BRIEF DESCRIPTION OF THE DRAWINGS

Further features, details and advantages of the invention can be seen from the wording of the claims and from the following description of embodiments based on the drawings. The figures show in:

DETAILED DESCRIPTION

Figure 1:
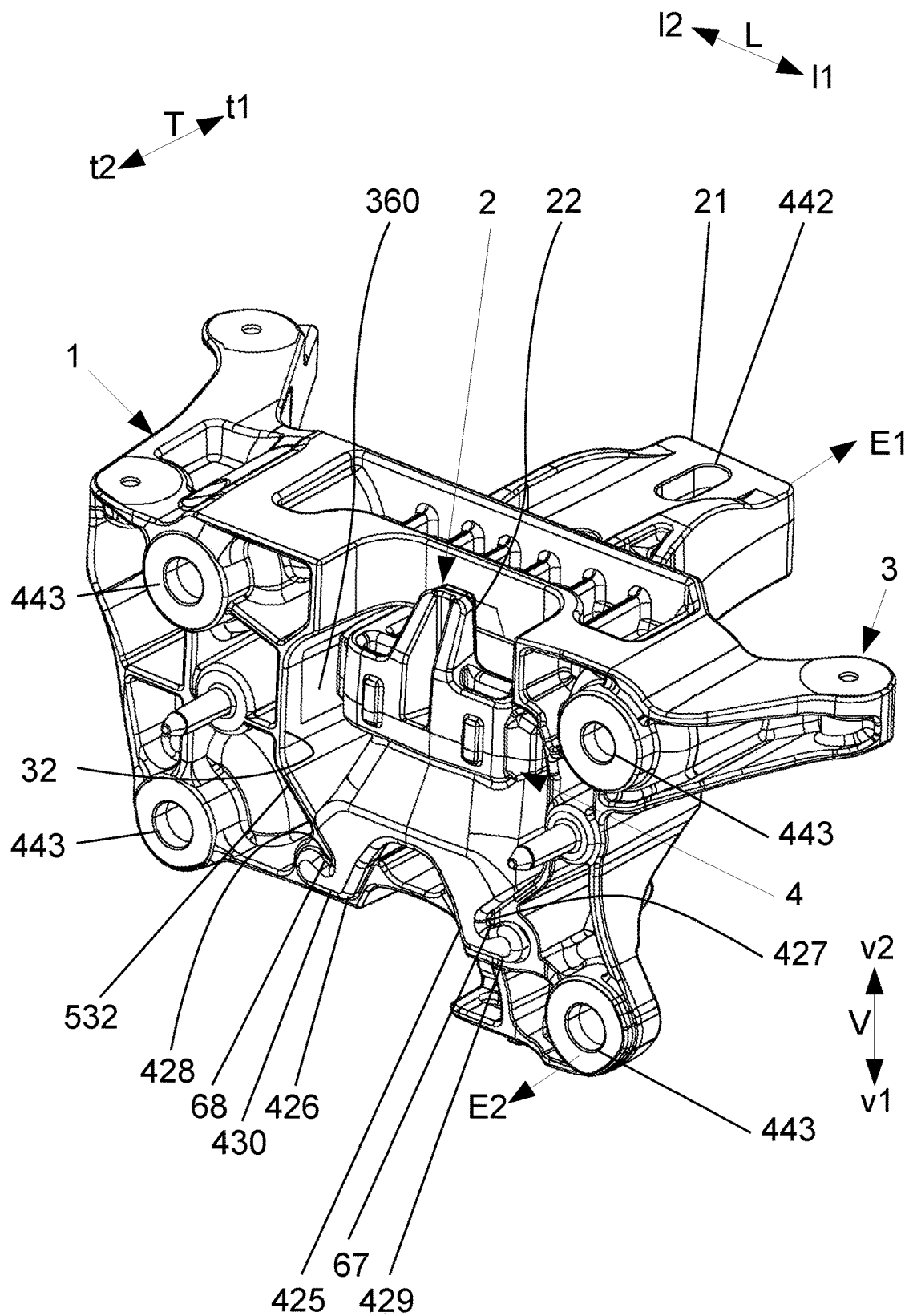
FIG. 1 a perspective view of a motor mount in an assembled state.
Figure 2:
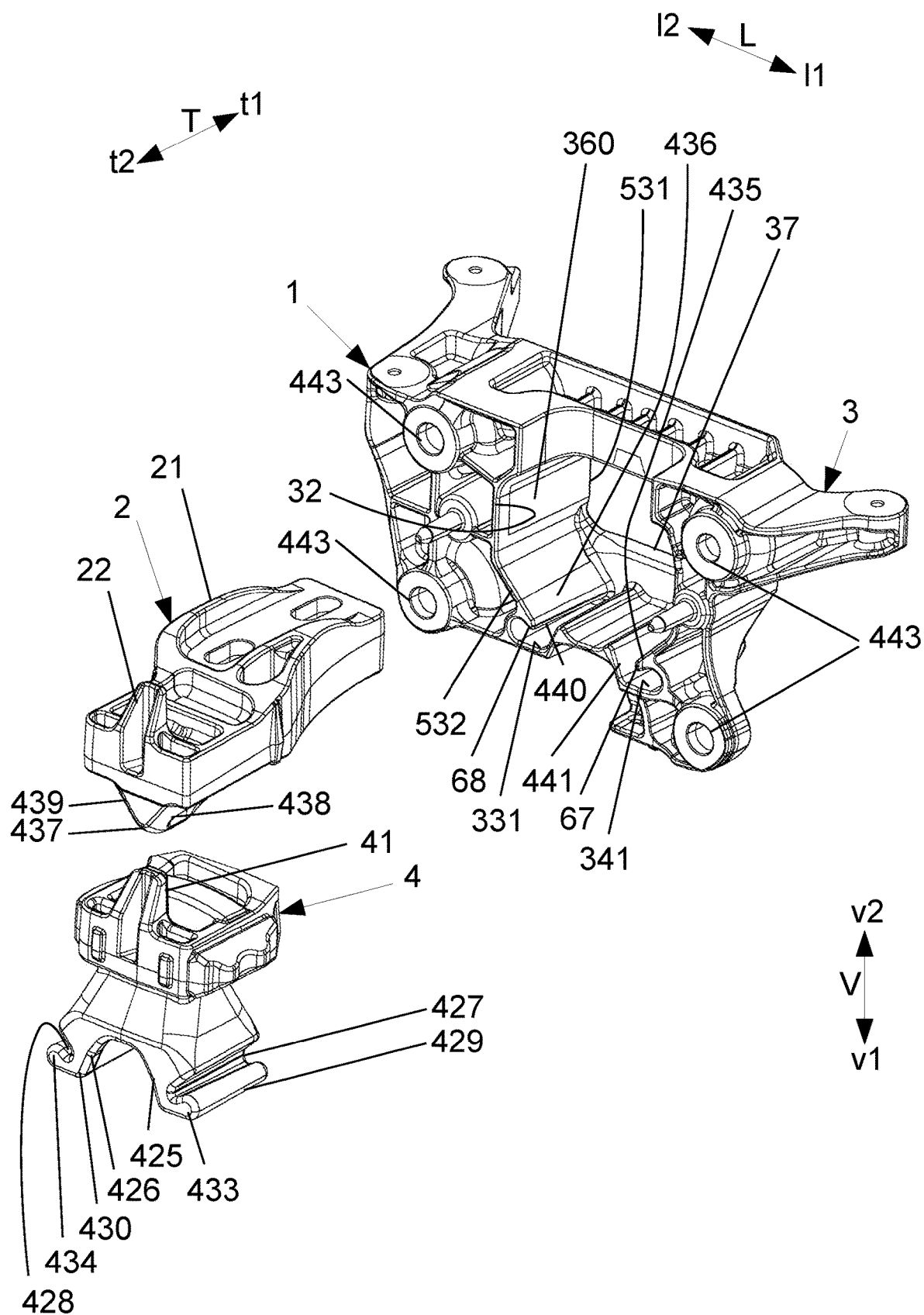
FIG. 2 an exploded view of the motor mount according to FIG. 1.

In the figures, identical or corresponding elements are each designated with the same reference signs and are therefore not described again unless appropriate. Features already described are not described again to avoid repetition and are applicable to all elements with the same or corresponding reference signs, unless explicitly excluded. The disclosures contained in the entire description are applicable mutatis mutandis to identical parts with identical reference signs or identical component designations. The positional indications selected in the description, such as top, bottom, side, etc., also refer to the directly described and depicted figure and are to be transferred mutatis mutandis to the new position in the event of a change of position. Furthermore, individual features or combinations of features from the different embodiments shown and described can also represent independent, inventive solutions or solutions according to the invention.

For ease of description, a three-dimensional, rectangular, Cartesian coordinate system may be used for orientation, wherein a first orientation T having two directions t1, t2 may correspond to the Y-axis (or transverse axis), a second orientation L having two directions l1, l2 may correspond to the X-axis (or longitudinal axis), and a third orientation V having two directions v1, v2 may correspond to the Z-axis (or vertical axis). These orientations can be related to an installation position of the motor mount 1 in a vehicle.

FIGS. 1 to 4 show a motor mount 1 according to the invention. The depicted motor mount 1 comprises an attachment member 2 to which a first element E1 can be attached. Said first element E1 might be the motor of a vehicle that can be attached via fixing devices that engage into an engaging hole 442 in the attachment member 2. Said attachment member 2 is rigid and may be a metal part. Said attachment member 2 comprises an arm 21 extending in the first orientation T. Said arm 21 is intended to be fixed to the first element E1. Furthermore, said attachment member 2 comprises a head 22. The head 22 is integrally formed on the arm 21 and projects from the arm 21 in the second direction v2 of the third orientation V. As a result, the head 21 engages behind a framework 3.

Said motor mount 1 comprises a framework 3 to which a second element E2 can be attached, that might be vehicle body. Said framework 3 can be attached via fixing devices that engage into engaging holes 443 in the framework 3. Said framework 3 is rigid and may be a metal part.

Said attachment member 2 and said framework 3 are connected to each other by means of an elastomer body 4, that is attached to said attachment member 2. Hence, the elastomer body 4 supports the attachment member 2 vibrationally on the framework 2 and serves to isolate vibrations of the motor.

Said elastomer body 4 forming two elastomer legs 425, 426, wherein each of said elastomer legs 425, 426 having one groove 427, 428. Said grooves 427, 428 extend in the direction of the first orientation T and project in the second orientation L. As can be seen, the respective extension is greater than the projection. Said legs 425, 426 are free of a hole, in particular a hole in which an element for fixing the legs 425, 426 engages in order to penetrate said leg 425, 426. The elastomer body 4 comprises an upper part 41 molded around said head 22.

Said framework 3 comprising a recess 32 into which said attachment member 2 is inserted extending along said first orientation T and into which said elastomer body 4 is pressed along said first orientation T. Said recess 32 providing a passage in the first orientation T through the framework 3, having a first opening 531 and a second opening 532. Said recess 32 being open on its upper side, i.e. said side in the second direction v2 of the third orientation V.

Said framework 3 comprising a first tongue 67 and a second tongue 68 to form tongueand-groove connections with the two grooves 427, 428. The tongues 67, 68 extend in the first orientation T and project in the second orientation L. The respective extension is be greater than the projection.

Said framework 3 comprising a surface 37 delimiting the first opening 531. The first opening 531 extends in the second orientation L and third orientation V. Said first opening 531 is wider than the arm 21. However, the head 22 is arranged relative to the first opening 531 so that it abuts the framework 3 and cannot pass through the first opening 531. Thus, the framework 3 surrounds the arm 21 at the level of this first opening 531 and retains said head 22 in said recess 32.

Said framework 3 comprising a first surface 331 and a second surface 341, wherein said surfaces 331, 341 form part of a circumferential surface 360 of the recess 32. Said first tongue 67 defines a first window 440 with said first surface 331 and said second tongue 68 defines a second window 441 with said second surface 341. The elastomer legs 425, 426 extend through the respective windows 440, 441.

Retention of said elastomer legs 425, 426 in a form-fit and press-fit manner in the framework 3 is ensured by engaging of said tongues 67, 68 into said grooves 427, 428 and by compressing of said first elastomer leg 425 between said first tongue 67 and said first surface 331 and of said second elastomer leg 426 between said second tongue 68 and said second surface 341. The retention is designed free of a material-fit.

As a result, the respective tongue 67, 68, which is the element for fixing the respective leg 425, 426, is not completely surrounded by the leg 425, 426 on its circumferential side. The tongue 67, 68 engages only laterally in the leg 425, 426. Said tongues 67, 68 project facing a transverse plane Q of the motor mount 1, wherein said two tongues 67, 68 project towards each other. Furthermore, said first tongue 67 project towards said first surface 331 and said second tongue 68 project towards said second surface 341.

Figure 3:
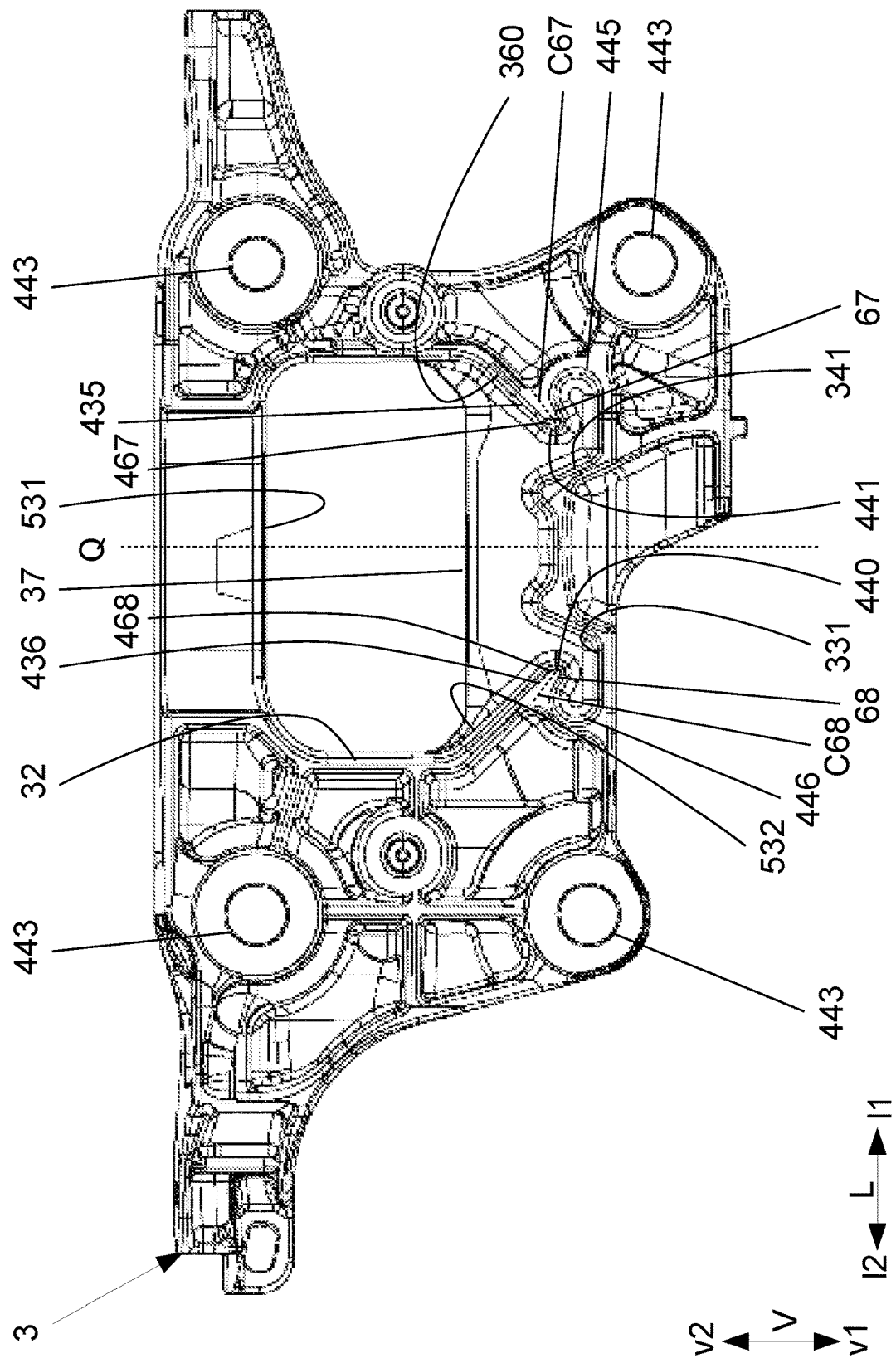
FIG. 3 a side view of the framework of the motor mount according to FIG. 1.
Figure 4:
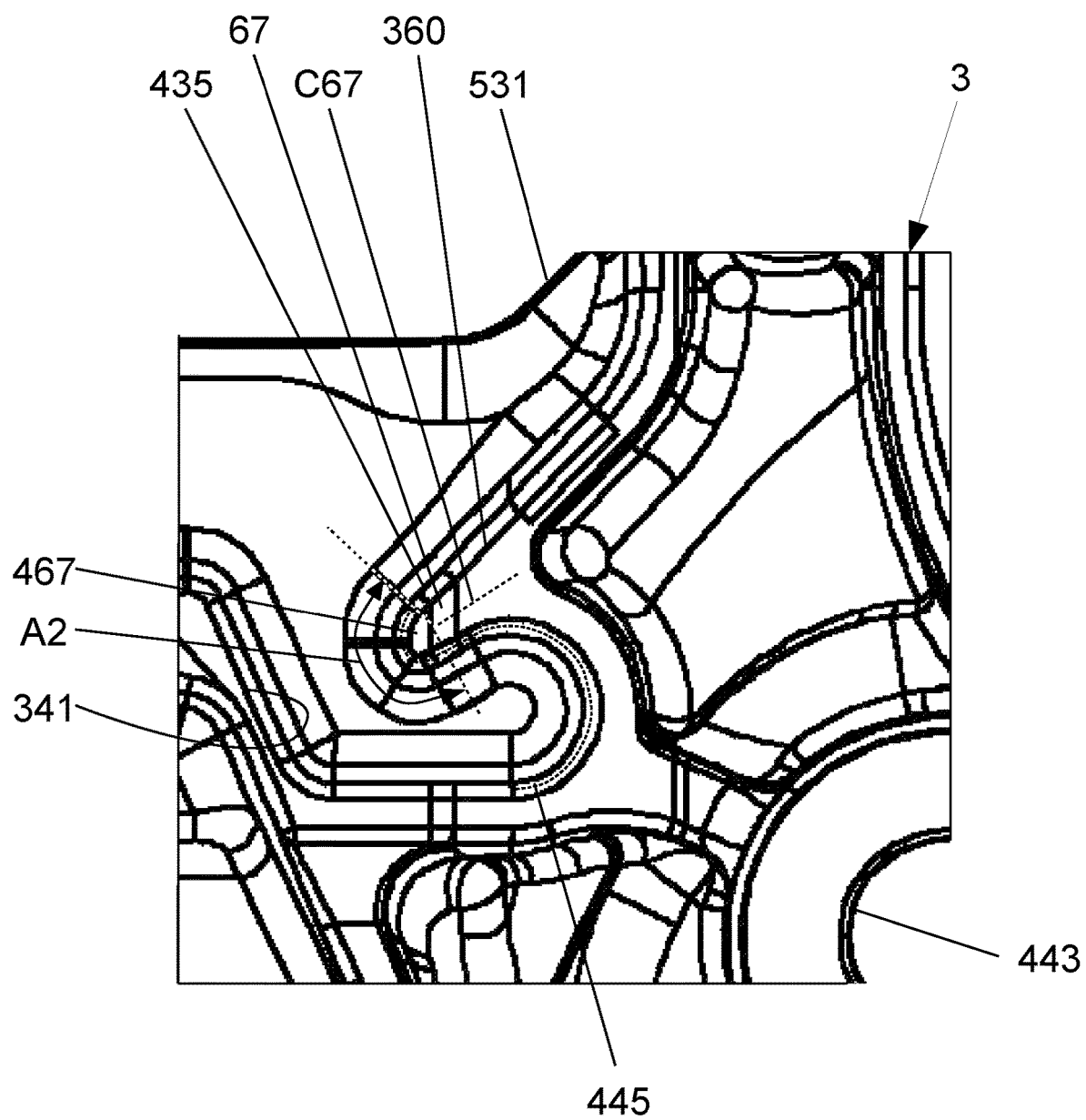
FIG. 4 an enlarged view of a detail auf FIG. 3.
Figure 4:
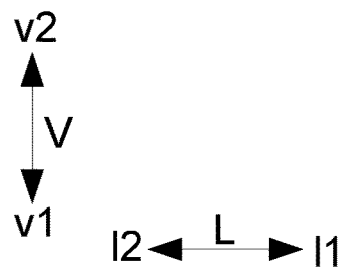
Figure 5:
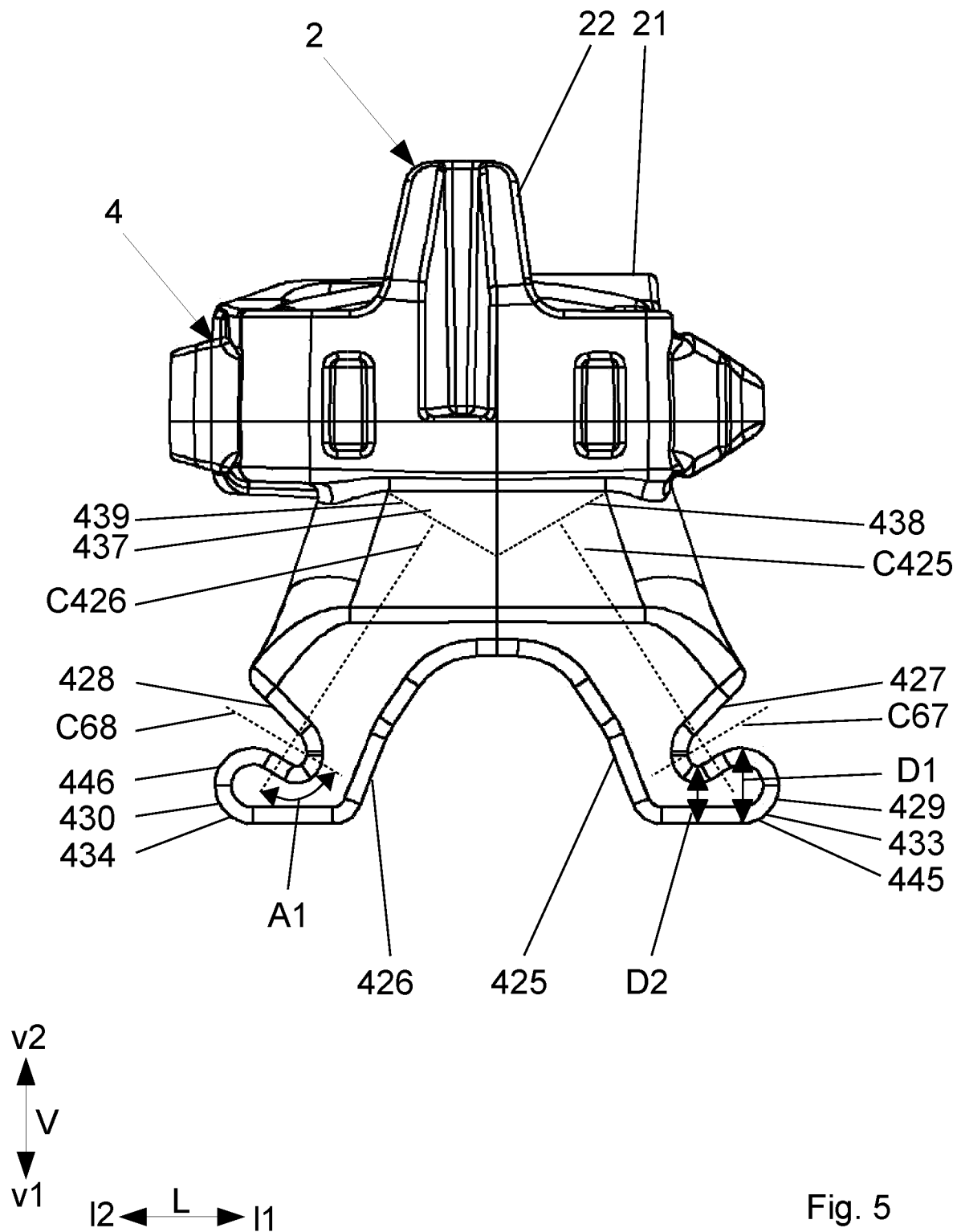
FIG. 5 a side view of an elastomer element and an attachment member according to FIG. 1.

As can be seen in FIGS. 3-5, a central course C67 of the respective tongue 67 and a central course C425 of the respective elastomer leg 425 enclose with each other an angle A1 in the range of 90° to 70°. Accordingly, a central course C68 of the respective tongue 68 and a central course C426 of the respective elastomer leg 426 enclose with each other an angle A1 in the range of 90° to 70°. Said angles A1 might be identical. Said angles A1 face away from the attachment member 2. For reasons of simplicity, only one angle A1 is shown.

As can be seen in FIGS. 3 and 4, the circumferential surface 360 of the recess 32 in the region of each leg 425, 426 forms an S-shaped course 445, 446. The corresponding tongue 67, 68 forming one half of said S-shaped course 445, 446. A contact angle A2 between the tip 467, 468 of each of the tongues 67, 68 and the respective leg 425, 426 is in the range from 270° to 90°, preferably from 180° to 135°. The tip 467, 468 of the corresponding tongue 67, 68 forms part of the respective S-shaped course 445, 446. As can be seen, over the extension of the contact angle A2, the corresponding leg 425, 426 and said tongue 67, 68 are in contact with each other.

Each of said elastomer legs 425, 426 forms an elastomer foot 429, 430 that engages under the respective tongue 67, 68. Both of the feet 429, 430 having a thickened portion 433, 434. The largest diameter D1 of each of the thickened portions 433, 434 is greater than a smallest distance D2 between the corresponding tongue 67, 68 and the corresponding surface 331, 341 of the framework 3. As can be seen, the diameter D1 of the thickened portions 433, 434 is in the range of 1.1 to 1.5 times greater than the smallest distance D2 between the corresponding tongue 67, 68 and the corresponding surface 331, 341.

FIG. 5 depicts that each of said tongues 67, 68 engages into the respective elastomer leg 425, 426 for a distance ranging from ⅓ of the leg width to ⅔ of the leg width. In the example shown, the tongues 67, 68 each protrude further than halfway into the corresponding leg 425, 426. Each of the elastomer legs 425, 426 is without a form-fit and a press-fit and a material-fit in said second orientation L over a length of ⅖ to ⅞ of the total length of the respective elastomer leg 425, 426. Said legs 425, 426 are thus free to swing and vibrate over the mentioned sections.

Each of said tongues 67, 68 forms a sliding surface 435, 436 along which the corresponding elastomer leg 425, 426 is able to slide when deformed in said second orientation L or around said first orientation T.

A pre-load is applied into said legs 425, 426 by pressing them into said framework 3. Here, each of the feet 429, 430 is in circumferentially continuous contact with the framework 3.

Said attachment member 2 forms a support structure 437 against which the two legs 425, 426 rest, wherein the central course C425, C426 of each of the legs 425, 426 meeting the support structure 437 at right angles.

The invention is not limited to one of the embodiments described above, but can be varied in many ways. All of the features and advantages, including constructional details, spatial arrangements and process steps, which emerge from the claims, the description and the drawing, can be essential to the invention both individually and in a wide variety of combinations.

All combinations of at least two of the features disclosed in the description, the claims and/or the figures fall within the scope of the invention.

In order to avoid repetition, features disclosed according to an apparatus are also to be considered as disclosed according to a process and are to be claimable. Likewise, features disclosed according to a process are to be considered as disclosed according to an apparatus as well and are to be claimable.

The invention claimed is:

1. A motor mount, comprising:
an attachment member,
a framework, and
an elastomer body attached to the attachment member,
wherein the elastomer body forms at least two elastomer legs, each of the at least two elastomer legs including at least one groove; the framework includes a recess, and the attachment member is insertable into the recess to extend along a first orientation; the framework comprises at least a first tongue and at least a second tongue; the framework comprises at least a first surface and at least a second surface; and the at least two elastomer legs are retained in a form-fit and press-fit manner in the framework via engagement of the first tongue and the second tongue in or with the at least one groove of each of the at least two elastomer legs and compression of the at least two elastomer legs between the respective first and second tongues and the first and second surfaces.

2. The motor mount according to claim 1, wherein the retention of the at least two elastomer legs is free of a material-fit.

3. The motor mount according to claim 1, wherein the first tongue and the second tongue project facing a transverse plane.

4. The motor mount according to claim 1, wherein a central course of the first tongue or second tongue, and a central course of the respective at least two elastomer legs meet or enclose with each other at an angle in a range of 90° to 70°.

5. The motor mount according to claim 4, wherein the respective first tongue or second tongue project towards said surfaces.

6. The motor mount according to claim 1, wherein a circumferential surface of the recess in a region of each elastomer leg forms an S-shaped course, and the tongue of each of the at least two elastomer legs forms a portion of the S-shaped course formed by each elastomer leg.

7. The motor mount according to claim 6, wherein, the corresponding tongue of each of the at least two elastomer legs forms one half of the S-shaped course formed by each elastomer leg.

8. The motor mount according to claim 1, wherein each of the at least two elastomer legs has an elastomer foot that engages under the respective first tongue and second tongue.

9. The motor mount according to claim 8, wherein each elastomer foot has a thickened portion whose largest diameter is greater than a smallest distance between the corresponding first or second tongue and the corresponding first or second surface.

10. The motor mount according to claim 1, wherein each of said tongues extends or engages into the respective elastomer leg for a distance ranging from ⅓ of a leg width to ⅔ of the leg width.

11. The motor mount according to claim 1, wherein each of the elastomer legs is without a form-fit and/or a press-fit and/or a material-fit in a second orientation over a length of ⅖ to ⅞ of a total length of the respective elastomer leg.

12. The motor mount according to claim 1, wherein each of the elastomer legs is without a form-fit and/or a press-fit and/or a material-fit in a second orientation over a length of ⅖ to ⅝ of a total length of the respective elastomer leg.

13. The motor mount according to claim 1, wherein each of said tongues has a sliding surface along which the corresponding elastomer leg is able to slide when deformed in a second orientation and/or around the first orientation.

14. The motor mount according to claim 1, wherein the attachment member forms a support structure against which the two legs rest, wherein a central course of each of the legs meet the support structure at right angles.

15. A motor mount assembly, comprising:
an attachment member,
a first element connectable to the attachment member,
a framework,
a second element connectable to the framework, and an elastomer body attached to the attachment member, wherein the elastomer body forms at least two elastomer legs, each of the at least two elastomer legs including at least one groove; the framework includes a recess, and the attachment member is insertable into the recess to extend along a first orientation; the framework comprises at least a first tongue and at least a second tongue; the framework comprises at least a first surface and at least a second surface; the at least two elastomer legs are retained in a form-fit and press-fit manner in the framework via engagement of the first tongue and the second tongue in or with the at least one groove of each of the at least two elastomer legs, and compression of the at least two elastomer legs between the respective first and second tongues and respective corresponding first and second surfaces.

16. A motor mount, comprising:
an attachment member,
a framework, and
an elastomer body attached to the attachment member, wherein the elastomer body forms a first elastomer leg and a second elastomer leg, each of the first elastomer leg and the second elastomer leg including a groove; the framework includes a recess, and the attachment member is insertable into the recess to extend along a first orientation; the framework comprises a first tongue and a second tongue; the framework comprises a first surface and a second surface; and the first elastomer leg and second elastomer leg are retained in a form-fit and press-fit manner in the framework via engagement of the first tongue in or with the groove of the first elastomer leg and engagement of the second tongue in or with the second elastomer leg, and compression of the first elastomer leg and second elastomer leg between the first tongue and the first surface and the second tongue and the second surface.

* * * * *